United States Patent [19]

Klebe

[11] 4,331,418
[45] May 25, 1982

[54] DOUBLE MASTED WAREHOUSE CRANE

[75] Inventor: Herbert F. Klebe, Norcross, Ga.

[73] Assignee: Harnischfeger Corporation, West Milwaukee, Wis.

[21] Appl. No.: 182,144

[22] Filed: Aug. 28, 1980

[51] Int. Cl.³ ................................................. B65G 1/06
[52] U.S. Cl. ..................................... 414/277; 414/282
[58] Field of Search .................................. 414/266–286

[56] References Cited

U.S. PATENT DOCUMENTS

| | | | |
|---|---|---|---|
| 3,631,940 | 1/1972 | Richins | 414/277 X |
| 3,661,280 | 5/1972 | Atwater | 414/281 X |
| 3,830,379 | 8/1974 | Dechantsreiter et al. | 414/274 |
| 4,252,217 | 2/1981 | Benjamin | 414/279 X |

FOREIGN PATENT DOCUMENTS

| 2154709 | 5/1973 | Fed. Rep. of Germany | 414/277 |
| 2261658 | 7/1973 | Fed. Rep. of Germany | 414/279 |

*Primary Examiner*—James L. Rowland
*Attorney, Agent, or Firm*—James E. Nilles

[57] ABSTRACT

An operator's carriage on one mast of a two-masted warehouse crane and which carriage can be raised independently of the motion, position, or operability of a load carriage mounted on the second mast. The crane comprises, in addition to the two carriages on two masts, a separate drive for vertically positioning each carriage on its respective mast, upper and lower trucks to which the ends of the masts are attached for longitudinal movement of the carriages and masts attached thereto along an upper and lower rails, and a shuttle mechanism and drive means therefor for moving loads from the load carriages onto storage racks, in a path transverse to the longitudinal path of the masts and carriages. Both carriages may be located between the masts but will be connected to only one, and in such a configuration may move vertically to their high and low limits of travel without contacting or physically interfering with each other.

3 Claims, 3 Drawing Figures

DOUBLE MASTED WAREHOUSE CRANE

BACKGROUND OF THE INVENTION

1. Field of Use:

This invention relates generally to warehouse cranes such as used to load storage stations arranged in horizontal rows and vertical columns on either side of a longitudinal path on which the crane travels. In particular, it relates to a crane which permits independently raising and lowering a pair of carriages, each of which is mounted on a separate mast of a double-masted warehouse crane.

2. Description of the Prior Art:

Warehouse cranes of both single- and double-masted construction are in wide use for loading and unloading materials from a rack comprising storage stations arranged in horizontal rows and vertical columns. These cranes typically shown in U.S. Pat. No. 3,830,379, issued Aug. 20, 1974, to Dechantsreiter, can travel longitudinally to place the loading mechanisms thereof adjacent any of the rack's vertical columns. Carriages to which the loading mechanisms are attached and which are vertically positionable on masts enable placement of the loading mechanism adjacent any of the rack's horizontal rows. Having thus been placed adjacent the desired storage station in a given vertical column and horizontal row, the loading or shuttle mechanism is moved transversely to the longitudinal path of the crane into the storage station, either to place a load into or remove a load from that station. Because the load on the shuttle mechanism may shift during this transverse movement, and because such shifting may jam the carriage when it is entering or leaving the storage station, preventing its vertical movement, a worker must reposition the load to free the carriage. With current single- or double-masted cranes, if the carriage is at a storage station in a horizontal row at a high elevation he has no alternative but to climb a stationary ladder on the crane to reach the shifted load, all of which is time consuming and laborious.

A carriage on current cranes is frequently limited in its movement by another carriage or carriages mounted thereon, whether the plurality of carriages is mounted on one or more masts. For example, U.S. Pat. No. 3,631,940, issued Jan. 4, 1972, to Richins, describes a double masted warehouse crane having both a load carriage and an operator's carriage. However, movement of the two carriages therein is interrelated with a lost motion switch, whereby the load carriage may move upwardly for a given distance independently of the operator's carriage but lifts the operator's carriage vertically upward therewith after that distance has been exceeded. This limitation can prevent access to the load carriage by the operator's carriage when the former is at certain heights. Additionally, each carriage described in Richin's is mounted to both of the masts.

SUMMARY OF THE INVENTION

The invention comprises a warehouse crane with a vertically-disposed main frame including an upper truck, a lower truck, and vertical, spaced apart masts between and rigidly attached to the trucks. The trucks are guided along a longitudinal path by a pair of guide rails, and each of the masts has connected thereto either a load carriage or an operator's carriage, each being vertically positionable on its respective mast. The load carriage includes a shuttle mechanism mounted thereon and drive means therefor, for supporting a load and moving it transversely of the crane's longitudinal path into storage stations arranged in horizontal rows and vertical columns adjacent one side of the longitudinal path. Hoist means are provided to raise and lower the load carriage on the vertical mast, and separate hoist means are provided to raise and lower the operator's carriage on its separate vertical mast. Each carriage is positionable independent of the position, movement, or operability of the other carriage. This feature of the mast arrangement enables an operator in the operator's carriage to vertically position himself adjacent the load carriage at any of the latter's vertical positions and completely independent of the movement of the load carriage.

DESCRIPTION OF A PREFERRED EMBODIMENT

Figure 1:
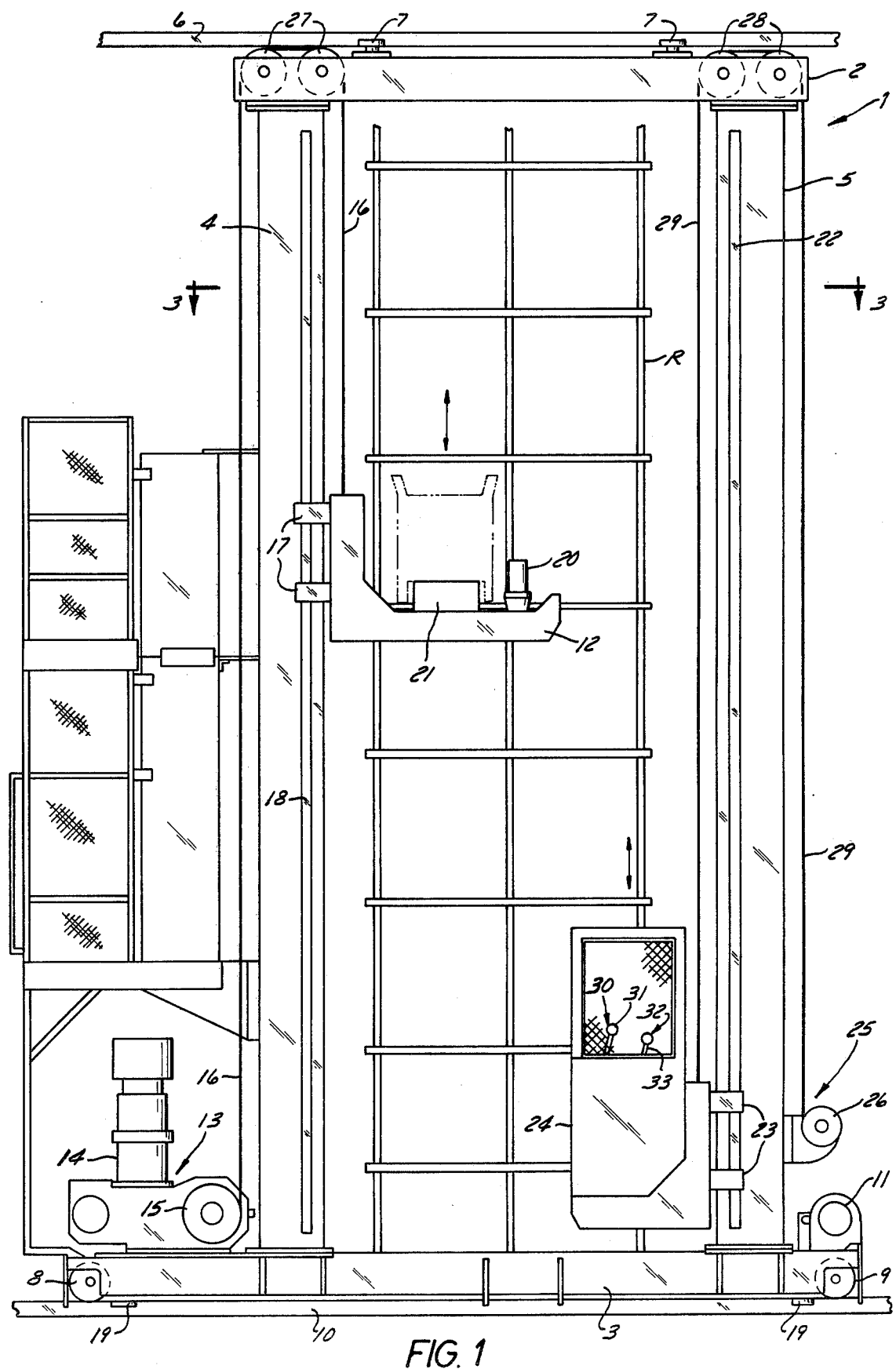
FIG. 1 is a side elevational view of an automatic warehouse crane in accordance with the invention showing one of the storage racks and showing the load carriage in a raised position and the operator's carriage in a lowered position.
Figure 2:
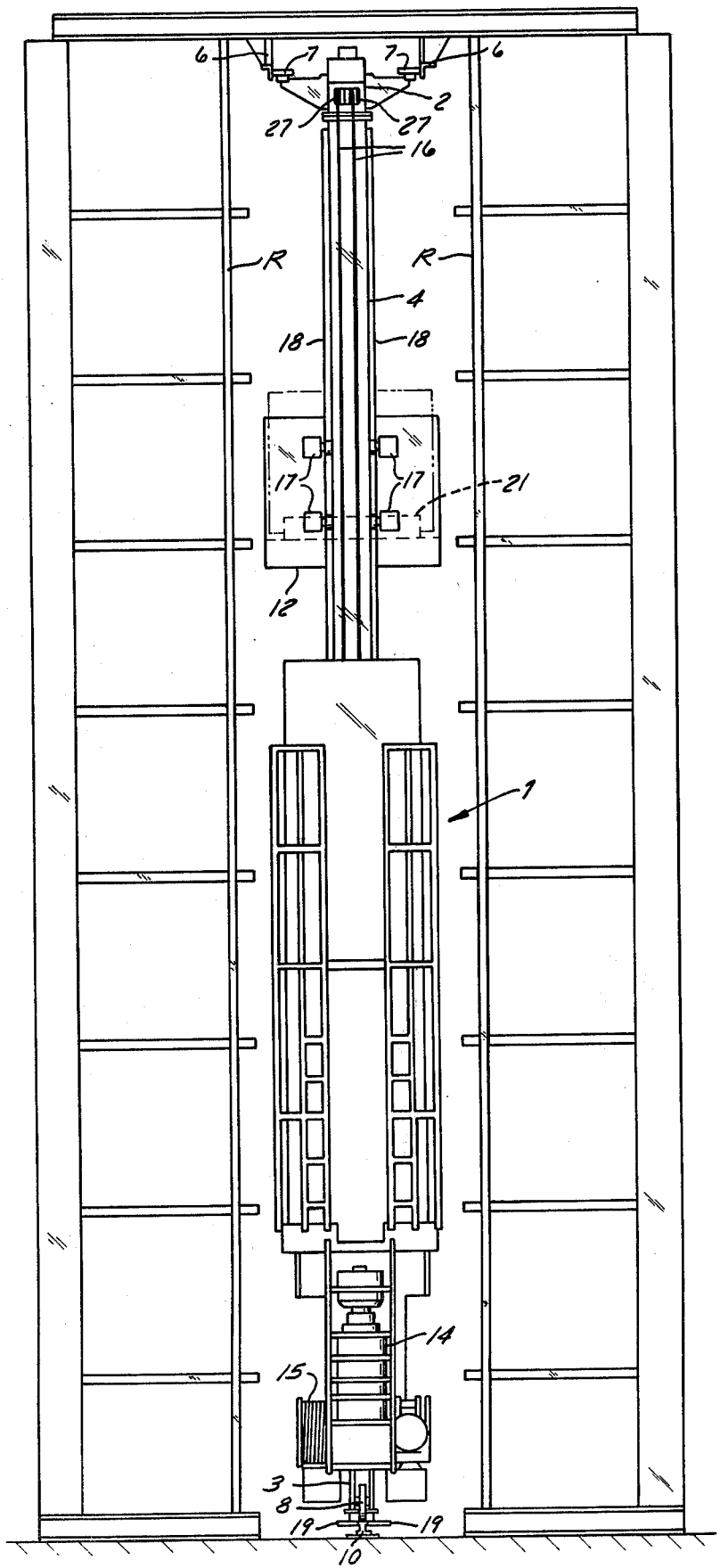
FIG. 2. is an end elevational view (left end as viewed in FIG. 1) of the crane of the invention.
Figure 3:
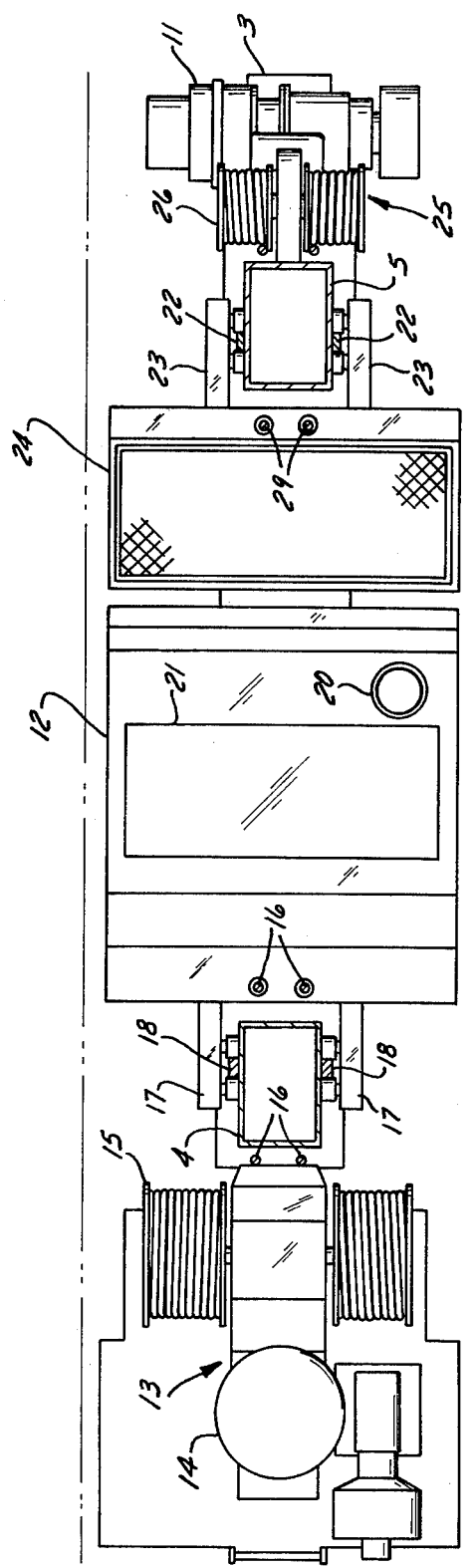
FIG. 3 is a cross sectional view of the crane taken generally along line 3—3 of FIG. 1.

The warehouse crane includes a main frame that is vertically disposed and which comprises an upper truck 2, a lower truck 3, and two vertically disposed masts 4 and 5, rigidly connected at their upper and lower ends to the upper 2 and lower 3 trucks, respectively. A pair of overhead or upper guide rails 6 is provided and are mounted in any conventional manner, for example, as part of a building structure. A pair of guide rollers 7 are fixedly attached to both sides of the upper truck 2, and ride along and are guided by upper guide rail 6, for movement of the upper truck 2 along a longitudinal path. Lower truck 3 has a pair of wheels, an idler wheel 8 and a drive wheel 9, suitably journalled within frame members of lower truck 3, on which the latter rides along a lower guide rail 10 mounted on the floor for movement of the lower truck 3 along a longitudinal path. A plurality of guide rollers 19 are fixedly attached to lower truck 3, and ride along and are guided by lower guide rail 10 for guiding of the lower truck 3. Longitudinal movement of the truck 3 is effected by the aisle drive 11, a motor and gear reducer connected in the known manner to drive wheel 9 for movement thereof in a clockwise or counterclockwise direction, depending on the desired direction of movement of lower truck 3. As lower truck 3 moves longitudinally along and is guided by lower guide rail 10, upper truck 2, which is connected to lower truck 3 by vertical masts 4 and 5, moves longitudinally along and is guided by upper guide rail 6. Further details of construction of the crane described herein may be obtained, if desired, in U.S. Pat. No. 3,830,379, issued Aug. 20, 1974, to Dechantsreiter et al.

Vertical masts 4 and 5, part of main frame 1 and rigidly connected between trucks 2 and 3, move longitudinally when the trucks are in motion. Mast 4 has mounted thereto a load carriage 12 which may be vertically positioned on the mast 4 by load carriage hoist means 13. These means comprise a load hoist drive 14 fixedly mounted to lower truck 3 and rotating hoist drum 15 in either direction for extending or retracting a pair of load hoist cables 16 therefrom. The cables 16, in addition to their mounting about drum 15, are mounted at their other ends to the top of load carriage 12 and each is reeved between a double pair of load hoist sheaves 27 journalled about a horizontal axis to the frame of upper truck 2. Brackets 17, fixedly attached to load carriage 12, are slidably engaged on vertical guide bars 18, which are attached to mast 4 to guide the upward and downward movement of load carriage 12 as the cables 16 are retracted by and extended from hoist drum 15, respectively. That hoist drum 15 is controlled by an operator in operator's carriage 24 with manual control means 30, which are operated by a load carriage hoist control stick 31 attached thereto. Alternatively, the hoist drum 15 may be controlled automatically by such as a computer-operated storage and retrieval system (not shown) which automatically determines where the load carriage 12 should go to place or retrieve a load requested by the operator. The control means used herein, which are typical of many control configurations that could be used, are described in greater detail in the Dechantsreiter U.S. Pat. No. 3,830,379, referred to in the Prior Art section hereinabove.

The warehouse crane described herein permits loading and unloading of a stationary load storage rack R, the rack having a plurality of storage stations arranged in horizontal rows and vertical columns adjacent one side of the main frame's longitudinal path. Movement of the load carriage 12 to a given vertical column is effected by longitudinal movement of the main frame 1 along upper 6 and lower guide rails 10. Once in the desired column, movement of the load carriage 12 to a given horizontal row is effected by its vertical movement on the vertical guide bar 18 of mast 4. The load carriage 12, adjacent the desired storage station, is ready to position its load therein. A shuttle drive 20 and a shuttle mechanism 21 powered thereby are mounted to load carriage 12 and effect movement of a load on load carriage 12 in a path transversely or normal of the longitudinal path of the main frame 1 into the adjacent storage station.

Vertical mast 5, spaced apart from vertical mast 4, has attached thereto vertical guide bars 22, and brackets 23 fixedly attached to a second or operator's carriage 24 are slidably engaged on vertical guide bars 22 to guide vertical movement of carriage 24 on mast 5. This second carriage may also function as a load carriage. This vertical movement is effected by the second carriage hoist means 25 which include a carriage hoist 26, essentially a powered winch rigidly attached about a horizontal axis to mast 5, four hoist sheaves 28 journalled about a horizontal axis to the frame of upper truck 2, and two hoist cables 29, each reeved between a pair of sheaves 28 and attached at their ends to the top of carriage 24 and to hoist 26. Carriage hoist means 25 effect upward and downward movement of the second carriage 24 by retracting and extending cables 29, respectively, from the winch of operator's hoist 26. That hoist 26 is controlled by an operator in carriage 24 with manual contol means 32 therein, which are operated by a carriage hoist control strick 33 attached thereto. As may be appreciated by the above description of the load and operator's carriage hoist means 13 and 25, the load carriage 12 and operator's carriage operate completely independently of each other. The vertical positioning of the operator's carriage does not depend upon the operability, position, or movement of the load carriage, just as the vertical positioning of the load carriage does not depend upon the operability, position or movement of the operator's carriage. Because masts 4 and 5 are parallel to one another and because they are of equal heights, an operator in the operator's carriage 24 may position himself adjacent the load carriage 12 at any of the latter's vertical positions. While both the load carriage 12 and operator's carriage 24 are located between masts 4 and 5 in this embodiment, each is connected to only one of the two masts and there is provided space between the two carriages such that they will not physically interfere with one another when moving vertically on masts 4 and 5.

RECAPITULATION

This invention provides a means for independently raising and lowering the operator's carriage and load carriage of a two-masted crane whereby an operator may vertically position the operator's carriage alongside the load carriage when the latter is in any vertical position. Accordingly, an operator will have a safe place to stand while repositioning a load on the load carriage that has shifted while being moved into or out of storage racks, which shifting has caused the load carriage to jam. The respective carriages are each attached to only one mast, and are each raised and lowered by completely independent means therefor.

I claim:

1. A warehouse crane having a vertically disposed main frame and including an upper truck and a lower truck, a pair of vertically disposed and spaced apart masts rigidly connected between said trucks, upper and lower guide rails for guiding said upper and lower trucks, respectively, of said main frame along a longitudinal path, a load carriage movably mounted on one of said masts for vertical positioning thereon, a shuttle mechanism carried by said load carriage and for supporting a load, said shuttle mechanism movable transversely of said longitudinal path whereby said load can be transferred from said load carriage and into load storage stations arranged in horizontal rows and vertical columns adjacent one side of said longitudinal path, hoist means for said load carriage for vertically positioning the same relative to said load storage stations, a second carriage vertically positionable along the other of said masts, hoist means for said second carriage for vertically positioning the latter independently of the operation and vertical position of said load carriage, whereby an operator in said second carriage can vertically position himself adjacent said load carriage at any of the latter's vertical positions and completely and independently of movement of the load carriage, said load carriage is located between said masts but spaced from the other of said masts and said second carriage is located between said masts but spaced from one of said masts whereby said carriages can move independently of one another in the space between said masts and without physical interference from one another.

2. A crane as set forth in claim 1 including power means mounted on said lower truck for driving said crane along said guide rails.

3. A crane as set forth in claim 1 further characterized in that said load carriage hoist means is mounted on said lower truck and is located to one side of said one of said masts which is opposite to the side on which said load carriage is mounted.

* * * * *